United States Patent [19]
Lane

[11] 3,971,198
[45] July 27, 1976

[54] COLLECTOR FOR A POWER LAWNMOWER

[75] Inventor: Joseph J. Lane, Thief River Falls, Minn.

[73] Assignee: Arctic Enterprises, Inc., Thief River Falls, Minn.

[22] Filed: Dec. 23, 1974

[21] Appl. No.: 535,423

[52] U.S. Cl. ................................ 56/202; 56/16.6
[51] Int. Cl.² ........................................ A01D 35/22
[58] Field of Search .................. 56/202, 10.8, 16.5, 56/16.6

[56] References Cited
UNITED STATES PATENTS

| | | | |
|---|---|---|---|
| 2,910,818 | 11/1959 | Beal et al. | 56/202 X |
| 3,199,277 | 8/1965 | Moody | 56/202 X |
| 3,228,177 | 1/1966 | Coates | 56/10.8 X |
| 3,606,747 | 9/1971 | Bauman | 56/202 |
| 3,708,968 | 1/1973 | Enters et al. | 56/202 X |
| 3,716,977 | 2/1973 | Jackson | 56/202 |
| 3,872,656 | 3/1975 | Dahl | 56/202 |

*Primary Examiner*—Louis G. Mancene
*Assistant Examiner*—Daniel J. Leach
*Attorney, Agent, or Firm*—Allegretti, Newitt, Witcoff & McAndrews

[57] ABSTRACT

An assembly for mounting on a power lawnmower for collecting grass clippings and the like in a disposable flexible container. The assembly includes a support for maintaining the flexible container in a substantially upright position with an open top and located rearwardly of the lawnmower housing. A cover is pivotally carried on the support and encloses the open top of the flexible container. The cover and the flexible container cooperate to define a substantially enclosed chamber. Spaced inlet and outlet openings are provided in the chamber. An inlet channel, extending upwardly and rearwardly from the mower housing, is connected to the inlet opening for discharging yard clippings into the flexible container. An exhaust assembly communicates with the outlet and the exterior. The opening faces in a direction away from the operator of the lawnmower. A separator is mounted in the cover to separate the clippings and other solids from the air so that the exhaust air is substantially free of such solids as it passes through the exhaust.

12 Claims, 10 Drawing Figures

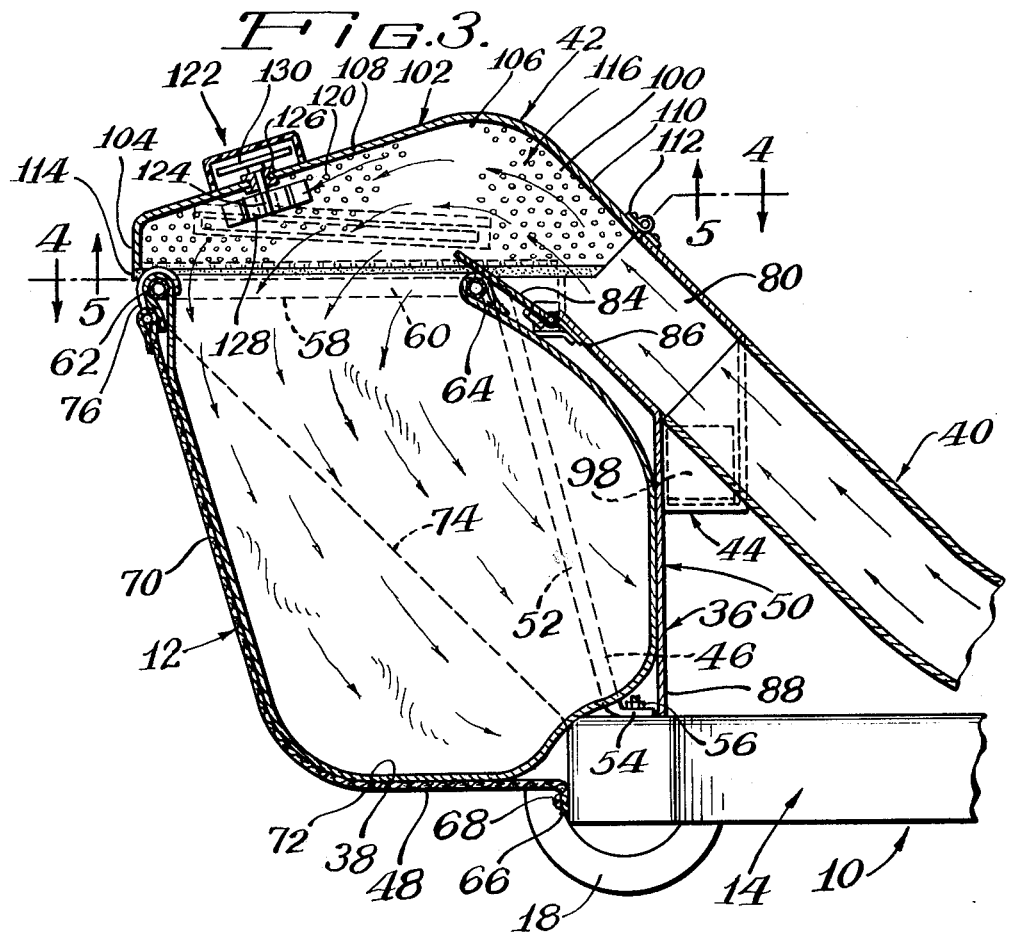
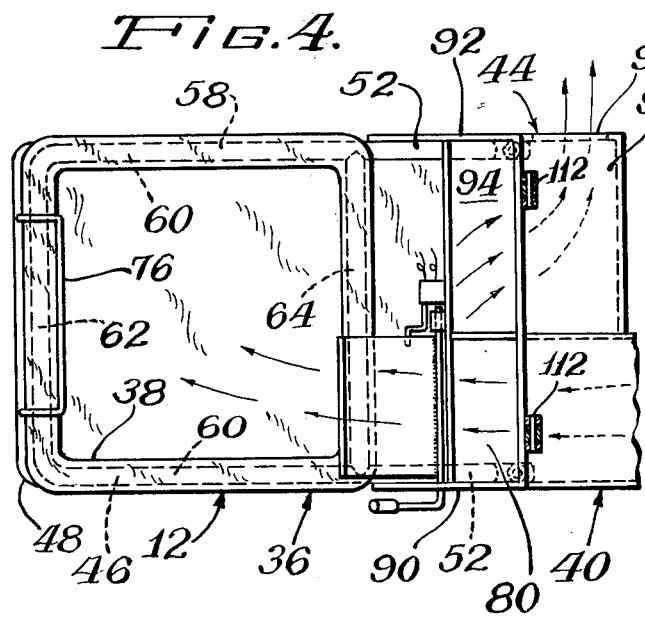
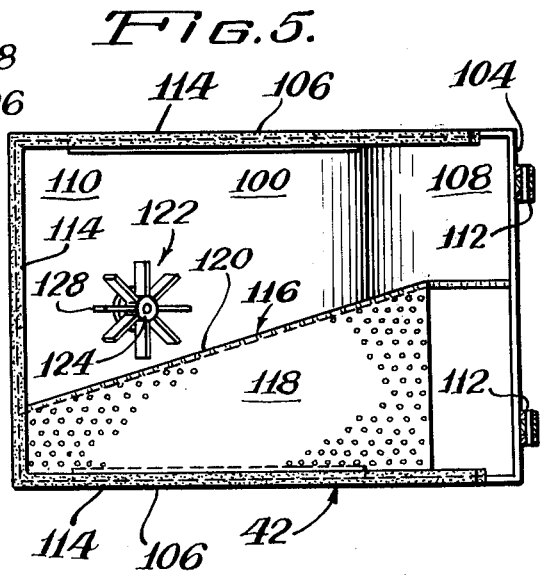

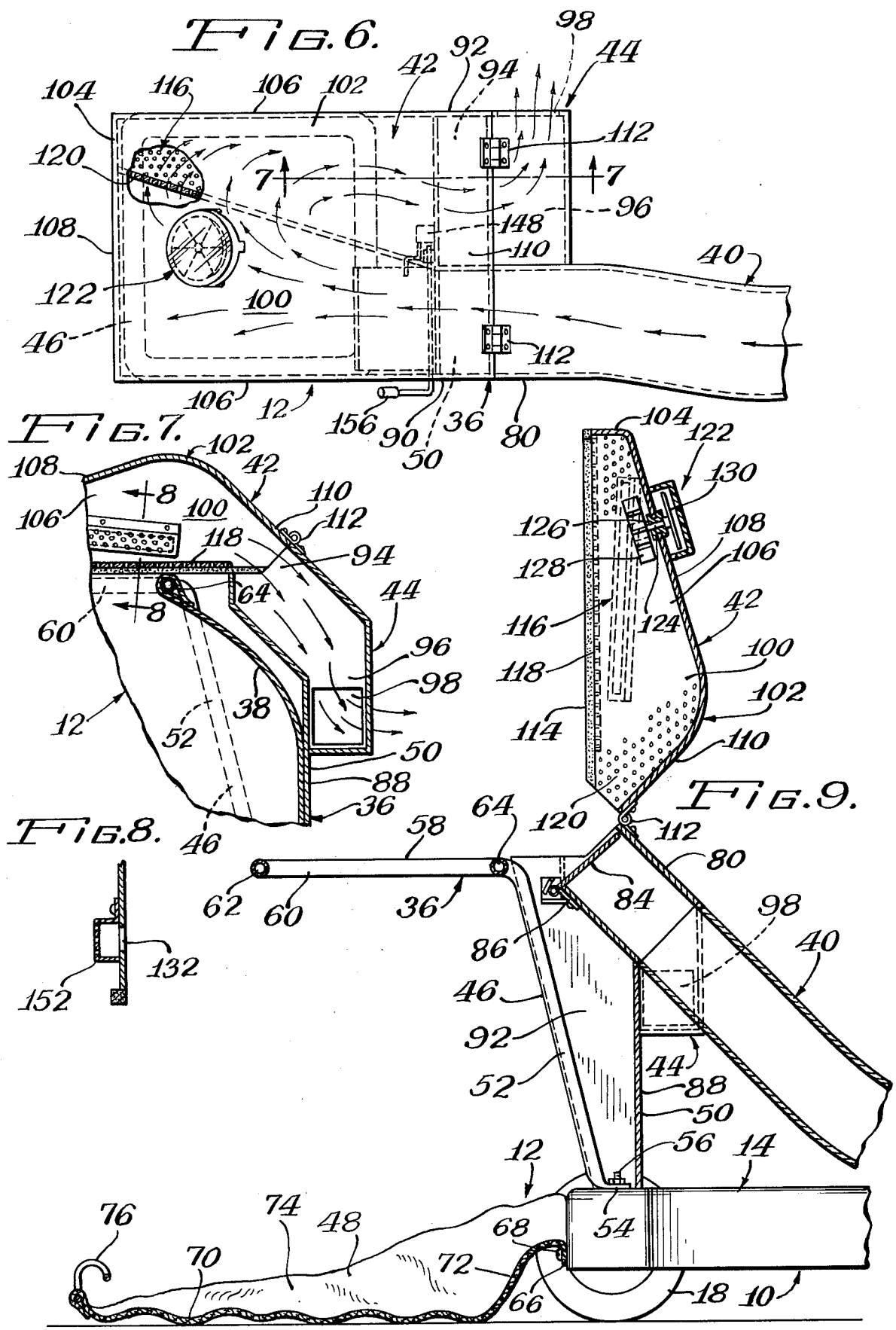

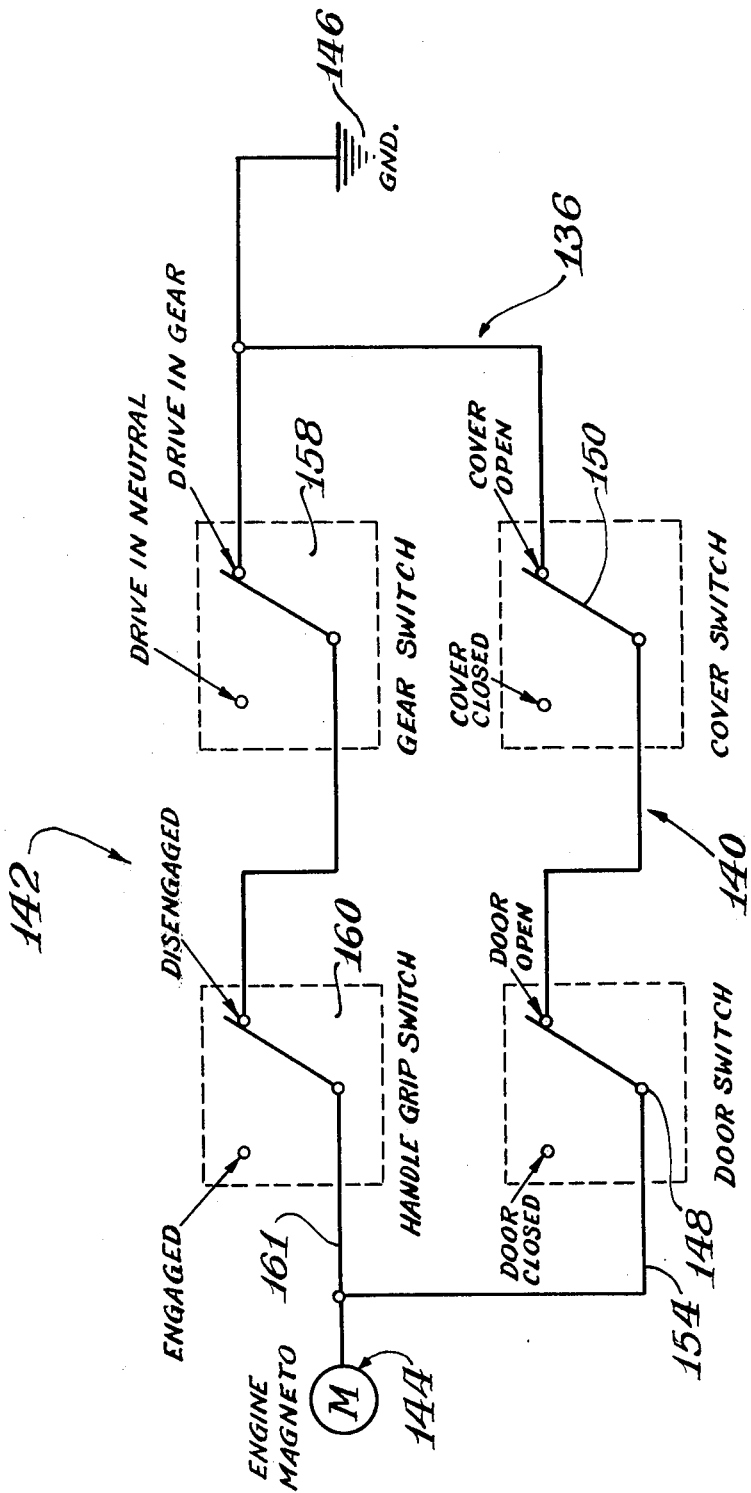

COLLECTOR FOR A POWER LAWNMOWER

BACKGROUND OF THE INVENTION FIELD OF THE INVENTION and DESCRIPTION OF THE PRIOR ART This invention relates to an improved assembly for collecting grass clippings, yard debris and the like in a disposable, flexible container which is supported on the lawnmower.

Collectors for receiving yard clippings from lawnmowers have been used for many years. With the older, manually operated reel type lawnmowers, a collector with an open top and front was merely mounted on the mower in back of the reel, and the grass clippings were collected therein. The clippings were then removed from the collector and then disposed of separately and the collector was re-mounted on the mower. Some power drive reel type mowers often use the same type of grass collector.

In the case of rotary, power driven motors, the rotary blade rotates at a high speed and a partial vacuum is created on the upper side of the rotating blade. The grass is cut by the blade while being lifted upwardly by the vacuum and is generally discharged through an opening in the housing, normally along a side wall. Although operators of rotary lawnmower often do not use grass collectors, from the standpoint of safety, it is considered highly desirable to use a collector on the opening in the lawnmower housing for collecting the yard clippings and other yard debris. It is well known that sticks, stones, wire, and the like can be forcefully thrown, and possibly cause serious injury to persons in the vicinity, from the centrifugal force of the rotating blade of the mower. For this reason also, it is highly desirable to use collectors in connection with rotary type mowers.

Generally, commercially used collectors for rotary type mowers comprise a container, as a flexible mesh bag, which is secured to the side wall of the housing adjacent the opening and the clippings and other yard debris are directed into the bag or the like. Representative types of collectors for receiving clippings from rotary type mowers are shown in Bennett U.S. Pat. No. 2,807,126; Smith et al. U.S. Pat. No. 2,931,157; Farnam U.S. Pat. No. 2,942,396; Beal et al. U.S. Pat. No. 2,910,818; Blume U.S. Pat. No. 2,990,666; Weiland U.S. Pat. No. 3,006,128; Moody U.S. Pat. No. 3,199,277; Weiland U.S. Pat. No. 3,367,091; Nolan U.S. Pat. No. 3,398,514; Bauman U.S. Pat. No. 3,606,747; Dahl U.S. Pat. No. 3,646,739; Rutherford U.S. Pat. No. 3,706,189; Enters et al. U.S. Pat. No. 3,708,968; Corbett U.S. Pat. No. 3,722,192; Mathews U.S. Pat. No. 3,753,340; Soldavini U.S. Pat. No. 3,757,503; and Opitz U.S. Pat. No. 3,802,173.

Although the structures of the above patents may disclose useful devices, all are considered deficient in one or more respects. For example, a numbeer of the prior art devices are not suitably safe, as the yard debris and grass clippings can blow directly onto the operator, which is not only an unsafe condition, but also an unpleasant one. Many of the devices are complex in construction and the machines do not all adapt to a wide range of uses, including cutting heavy, moist spring grass, picking up leaves, and operating under dry dusty conditions.

For the most part, the above patents do not disclose collecting the yard clippings or yard debris in a disposable container. It is considered a distinctive advantage to collecting the clippings directly in a disposable container as this avoids the necessity of having to empty the contents of a non-disposable container into a bushel basket or a disposable plastic bag of the type widely used today. Three of the prior art patents, discussed above, show the use of flexible plastic containers for collecting the yard clippings and debris and include the Moody patent, the Enters et al. patent and the Corbett patent. As to each of the devices shown in these references, each is considered less than satisfactory. The Moody patent shows a box-like container at the rear of the lawnmower and having a screen-like top. Yard clippings, are directed into the plastic container. However, the screen opening faces directly up to the operator. A unit of this type is considered highly undesirable when the lawnmower is being used in dry weather, as dust and dirt particles would fly directly up in front of the operator.

The Enters et al patent uses a plastic bag which is supported only along its bottom. Also, a complex inlet and exhaust system require the use of fan blades acting as a separator.

The Corbett U.S. Pat. No. 3,722,192 uses a flexible disposable bag in connection with screening. The bag is removably mounted onto the handlebars. A separate rigid cover is required in order to cover the screening or perforated covering in order to protect the operator. There is no continuous flow of air through the collection chamber, thus seemingly creating a turbulent air flow condition which would be particularly objectionable in dusty weather, as the dust would be blown forwardly and actually into the path of the operator. It is apparent, from the state of the art, that there is a real need for an improved collector for lawn clippings used on a rotary type mower, wherein the lawn clippings and yard debris are collected directly into a disposable flexible container.

SUMMARY OF THE INVENTION

In view of the foregoing, it is an important object of this invention to provide an improved collector assembly for receiving yard clippings and lawn debris from a power lawnmower wherein the drawbacks and disadvantages of prior art lawn debris collectors are significantly reduced.

It is also an object of this invention to provide an improved collector for receiving yard clippings and lawn debris from a rotary type lawnmower wherein the clippings and debris are carried directly into a disposable container while the air flows in a substantially continuous path through an inlet, through a perforate material to separate out air carried solids, and then through an exhaust directed laterally from the normal path of movement of the operator.

It is a further object of this invention to provide an improved collector for mounting on a rotary type of lawnmower, wherein the assembly is characterized by a high degree of safety for the operator and those in the vicinity by providing an almost totally enclosed chamber for collecting the yard clippings and lawn debris while solids are screened out of the air before the air passes to the exhaust which is diverted laterally of the path of travel of the operator.

It is another object of this invention to provide an improved collector for yard clippings and lawn debris for mounting on a rotary type of lawnmower, wherein the apparatus is characterized by its simplicity and economy of construction, manufacture and operation, and which is further characterized by a high degree of safety for the operator and those in the vicinity.

It is still another object of this invention to provide a disposable collector bag for mounting on a rotary type of lawnmower for collecting lawn debris and lawn clippings wherein the assembly includes means for switching off the motor to avoid having the operator being exposed to direct air flow from an inlet chute extending from the housing of the lawnmower to the collecting bag.

It is still another object of this invention to provide an improved assembly for collecting yard clippings and lawn debris for mounting on a rotary type of lawnmower wherein the operator many readily view the interior of the chamber receiving the clippings and debris, and wherein a suitable device is provided for externally indicating when the disposable container carrying the clippings is full and requires disposal.

Further purposes and objects of this invention will appear as the specification proceeds.

The foregoing objects are accomplished by providing an assembly which collects grass clippings in a disposable flexible container for mounting on a lawnmower housing, the assembly including structure for supporting the flexible container in a substantially upright, open position and rearwardly of the lawnmower housing, a cover is pivotally carried on the support member for covering the open top of the flexible container, the cover and the flexible container defining a substantially enclosed chamber; inlet and outlet openings are spaced from each other in the chamber and are positioned on the cover; an inlet channel interconnects the housing of the lawnmower with the inlet opening and an exhaust port communicates the interior of the chamber with the exterior for directing exhaust air laterally away from the path of travel of the operator; a separator is positioned upstream of the exhaust opening in order to separate remaining air-carried solids from the exhaust air before the exhaust air passes through the exhaust; the housing, the inlet channel, the cover, the container and the exhaust provide a substantially continuous flow path for air passing to and from the enclosed chamber; and a detachable mounting is provided for supporting the flexible container so that the flexible container may be readily removed from its mounted position.

BRIEF DESCRIPTION OF THE DRAWINGS

One particular embodiment of the present invention is illustrated in the accompanying drawings wherein:

FIG. 3 is an enlarged, transverse, upright, sectional view of the collector assembly used in the embodiments of FIGS. 1 and 2;

FIG. 4 is a plan view of the interior of the collector assembly illustrated in FIG. 3 and taken along the line 4—4 of FIG. 3;

FIG. 5 is a plan view of the interior of the cover and taken along the line 5—5 of FIG. 3;

FIG. 6 is a plan view of the collector assembly embodied in FIG. 3;

FIG. 7 is a fragmentary, sectional view taken along the line 7—7 of FIG. 6, illustrating the exhaust port;

FIG. 8 is a detailed sectional view taken along the line 8—8, showing the guide track for the handle assembly;

FIG. 9 is a view, similar to FIG. 3, with the cover of the assembly in the open position, with the flexible container removed; and FIG. 10 is an electrical schematic showing the electrical circuitry to assure that the engine is in the stopped position at selected times.

DETAILED DESCRIPTION OF THE PREFERRED EMBODIMENT

Figure 1:
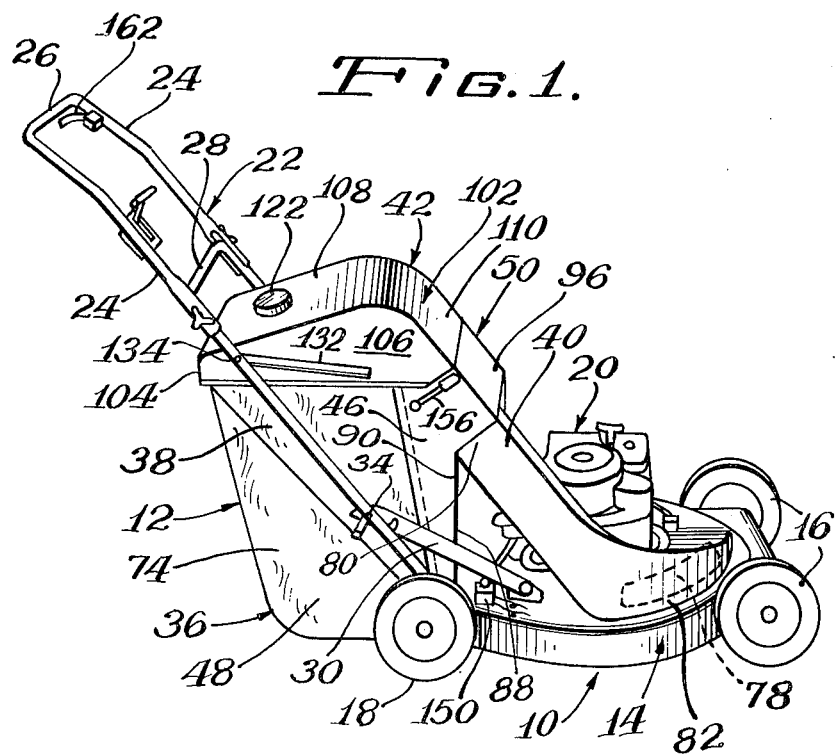
FIG. 1 is a pictorial view of one side of a lawnmower and the grass collector assembly embodying my invention.
Figure 2:
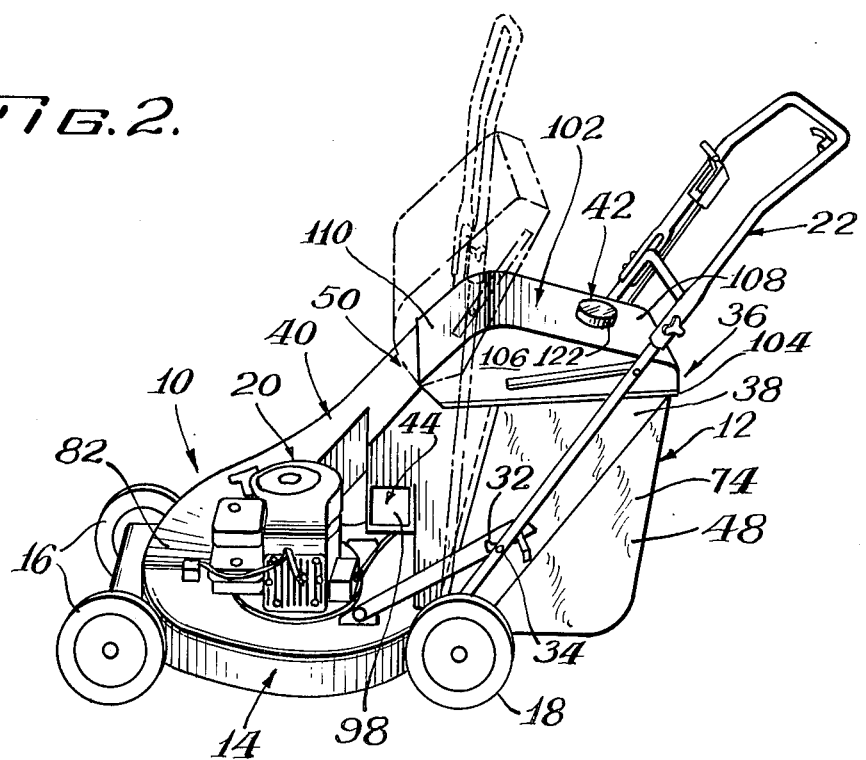
FIG. 2 is a pictorial view of the assembly of FIG. 1, from the opposite side and also showing, in phantom view, the cover and handle pivoted to a raised position.

Referring to FIGS. 1 and 2, a rotary type lawnmower, generally 10, has an improved collector assembly, generally 12, mounted thereon. The lawnmower 10 is of generally conventional construction and may be either a push type or a self propelled type of powerized rotary mower. The lawnmower 10 includes a housing 14 having a front pair of wheels 16 and a rear pair of wheels 18 rotatably and operatively mounted on the housing 14. Either pair of wheels are preferably driven by a drive (not shown) interconnected to the engine 20. An internal combustion engine 20 is operatively carried by the housing for rotating the cutting blade (not shown) in a horizontal plane, in a conventional manner, within the housing 14.

A handlebar assembly, generally 22, is pivotally mounted at its lower end to the rear of the housing 14. The handlebar assembly 22 includes a pair of normally upwardly and rearwardly extending arms 24 which are interconnected at the tops thereof, by a unitary gripping bar 26. A lower cross bar 28 is rigidly secured to the handlebar assembly 22 below the gripping bar 26. Support links 30 are pivotally mounted on the lawnmower housing 14 and include a slotted portion 32 which slidably receives a pin 34 mounted at the lower end of each of the arms 24 and act to limit the pivoting movement of the handlebar assembly 22.

Referring to FIGS. 1, 2, and 3, the collector assembly 12 includes a generally upright support assembly, generally 36, which is secured to the rear portion of the housing 14, a flexible disposable container 38 being positioned within the support assembly 36, an enclosed tunnel or chute, generally 40, for directing air carried clippings from within the housing 14 to the flexible container 38, a cover assembly, generally 42, for normally covering the flexible container 38, and an exhaust, generally 44, for directing exhaust air from within a substantially enclosed chamber defined by the cover 42, the support assembly 36, and the flexible container 38.

Referring particularly to FIGS. 3, 4, 6, and 9, the support assembly 36 includes a rigid upright support portion, generally 46, a flexible support portion, generally 48, and a combination support 50 for the inlet chute 40, the cover assembly 42, and the exhaust 44.

Referring to FIGS. 3, 4, and 9, the rigid support 46 comprises tubular upright legs 52 having feet 54 which are secured to the upper surface of the housing 14 by suitable fasteners 56. The upper ends of the legs 52 are unitarily formed to define a substantially horizontal portion 58 having unitary sides 60 and a back 62. At the junction between each of the horizontal portions 58 and the upright legs 52, a reinforcing cross member 64, generally parallel to the back 62, is rigidly secured to the inner surfaces of the sides 60. An upwardly directed opening is defined by the sides 60, the back 62, and the cross member 64. As seen in FIG. 3, the flexible container 38 is received in this opening and the top edges of the flexible container or bag 38 are folded down around the sides 60, the back 62 and the cross member 64, so that the support 46 supports the upper end of the container 38, in the open position, for receiving grass clippings and other lawn debris thereinto, in a manner to be hereinafter described in greater detail.

Referring to FIGS. 3 and 9, the flexible support 48 for the container 38 is rigidly secured along the lower edges 66 thereof to the housing 14 by a plurality of suitable fasteners 68. As seen in FIG. 3, in the raised, bag supporting condition, the flexible support 48 includes a back 70, a bottom 72 and angular sides 74. The back 70, the bottom 72, and the side 74 are unitarily formed of the same material, preferably a reinforced flexible fabric or plastic. As seen best in FIGS. 3, 4, and 9, the upper edge of the back 70 includes a hanger member 76 which is securely fastened thereto. The hanger 76 includes a hook portion which is constructed and arranged to hang on the upper edge of the back 62 of the horizontal portion 58 of the rigid support 46, to thereby hold the flexible support 48 in the bag supporting position.

The inlet chute 40 is of generally spiral shape and extends from the opening 78 in the upper front portion of the housing, as seen in FIG. 1, upwardly and rearwardly, to an upper end 80 thereof. The inlet chute 40 is preferably formed of a light weight material, such as a molded plastic of designated strength. As seen in FIG. 1, the lower end of the chute is generally arcuate in shape, and covers the opening 78 in the housing 14. Approximately 90° of a segment of the top of the housing 14 is covered by the lower portion 82 of the chute 40. The lower portion 82 is secured to the top surface of the housing 14 by suitable fasteners (not shown). The chute 40 has a cross sectional area at the lower portion 82 which diminishes rapidly to a substantially square cross-sectional shape of uniform area, as seen for example, in FIG. 9.

The upper end of the inlet chute 40 has a pivotable door 84 positioned thereon. The door 84 is pivotable from a closed position, as seen in FIG. 9, to an open position as seen in FIG. 3. The door 84 is pivotally carried by a hinge assembly 86 which moves the door 84 between open and closed positions. As will be described hereinafter in greater detail, the door 84 is a safety feature as it must be in a closed position when the engine is on so that the air and air-carried solids cannot be blown directly toward the operator's face. Additionally, as will be described hereinafter, a safety circuit is provided to stop the engine 20 if the cover 42 is in the open position and the door 84 is in the open position.

The combination support assembly 50, as seen in FIG. 3 and FIG. 9, is secured to the upper rear wall of the housing 14 of the lawnmower 10. The height of the support 50 is approximately the same as the rigid support 46. The support 50 includes an upright support wall 88 and upright side walls 90 on the chute side and 92 on the exhaust side. Preferably, the combined support 50 is constructed of a light weight, sturdy material, as a formed plastic.

The exhaust 44 is carried by the combined support 50 and includes a substantially upwardly directed opening 94, as seen best in FIG. 4, which communicates with a lower exhaust chamber 96 having an exhaust opening 98 which faces laterally outwardly of the lawnmower 10 and generally out of the path of travel of the operator, even though the air passing from the exhaust opening 98 contains very few air carried solids which might injure the operator.

As seen best in FIGS. 1, 2, and 3, the cover assembly 42 is preferably formed upwardly to define an upper air chamber 100 above the flexible container 38 and is hingedly supported by the support assembly 50. The cover assembly 42 includes an upwardly formed top wall 102, a rear wall 104, and a pair of opposed side walls 106. The top wall 102 includes a rearwardly and downwardly tapered rear portion 108 and a frontwardly and downwardly tapered front portion 110. The front portion 110 of the cover assembly 42 is hingedly secured to the support 50 by hinges 112, as seen in FIGS. 3, 4, and 5. The hinges 112 support the cover assembly 42 for pivotable movement from a closed position, shown for example, in FIG. 1, to an open position, shown in phantom view in FIG. 2 and in sectional view in FIG. 9. Seals 114, such as foamed plastic or rubber, are securely mounted along the lower edges of the rear wall 104 and the side walls 106 of the cover assembly 42 and act to provide a suitable air seal between the horizontal portion 58 and the cross member 64 of the rigid support 46 so that substantially no solid materials pass outwardly therebetween, thereby providing an added safety feature.

Referring to FIGS. 3 and 5, the exhaust half of the air chamber 100, mounted securely within the cover assembly 42, has a solids separator 116 rigidly mounted therein. As grass clippings and lawn debris are passed upwardly through the inlet chute 40 and into the air chamber 100, the clippings and lawn debris, primarily by action of gravity, drop downwardly into the container 38. The exhaust 44 provides an escape for air from the chamber defined by the container 38 and by the cover assembly 42. In order to substantially avoid passage of air-carried grass clippings or other air-carried solid particles through the exhaust 44, the separator 116 acts to separate such materials to avoid passage thereof through the exhaust opening 98. The separator 116 includes a perforated lower wall 118, and a unitary perforated upright wall 120 so that substantially only air can pass therethrough.

Preferably, a fill indicator, generally 122, is operatively mounted on the back portion 108 of the cover assembly 42. The indicator 122 includes a generally upright shaft 124 which is rotatably carried on a bearing 126 secured to the rear wall portion 108. The lower end of the shaft 124 rigidly carries a vane 128. The upper end of the shaft 124 includes an indicator plate 130. In use, the moving air normally keeps the plate 130 rotating by acting against the vane blades and thereby rotating the shaft 124. This rotation continues until the container 38 becomes full and the material within the container physically stops the vane from moving and/or reduced air flow carried by a full bag slows down rotation of the vane. When the vane stops moving or slows down, the operator knows that it is time to remove the filled flexible container 38 and replace it with a new one.

Referring to FIGS. 1, 2 and 8, a slot 132, slanted slightly upwardly and rearwardly, is provided in each of the side walls 106 of the cover assembly 42. A perforated channel 152 is mounted over each slot 132 to screen out air-carried solids. An inwardly directed pin 134 is securely mounted on each of the arms 24 of the handlebar assembly 22 and is carried within each slot 132. In order for the operator to open the cover assembly 42, the handlebar assembly 22 is pivoted forwardly, as seen in FIG. 2, and the cover assembly 42 is raised to the open position.

Referring to FIG. 10, there is a schematic diagram of a safety circuit, generally 136, to assure that the operator cannot open the cover 42, and have clippings or debris blown directly into the face, which may not only be uncomfortable, but may cause physical injury, as to the eyes.

The safety circuit 136 includes a cover safety circuit 140 and a drive wheel safety circuit 142, the circuits 140 and 142 being connected in parallel. The schematic diagram shown includes a power source such as an engine magneto 144. The circuits 140 and 142 are connected, in parallel between the magneto 144 and a ground connection 146. The cover safety circuit 140 includes a door switch 148 and a cover switch 150, which are connected in series in the line 154. The door switch 148 is mounted adjacent the door 84 which selectively covers the inlet chute 40. The handle 156 extends outwardly from the hinge assembly 86 of the door 84 and is manually pivoted by the operator. The door switch 148 is in the closed position when the door 84 is open and in the open position when the door 84 is closed. The cover switch 150 is mounted on the housing 14 and is responsive to the bracket or link 30 being in the raised position when the cover assembly 42 is in the open position and when in the closed position. When the cover 42 is open, the cover switch 150 is closed, and when the cover 42 is in the closed position, the cover switch 150 is in the open position.

The drive wheel circuit 142 includes a gear switch 158 and a handle grip switch 160 which is connected in series in the line 161 with the gear switch 158. When the drive mechanism (not shown) is in gear, transmitting power to the powerized wheels 16 or 18, the gear switch 158 is in the closed position. When the grip 162 on the handle assembly 22 is in the closed position, while being depressed by the operator, the grip switch 160 is in the engaged position. When the grip 162 is released, it is biased to the disengaged position by a spring (not shown) and opens or disengages the grip switch 160.

When both switches 158 and 160 are "closed" and/or when both switches 148 and 150 are "closed", the engine magneto 144 will "ground out" so as to stop the engine 20. The foregoing circuit 136 maintains the engine magneto 144 in the operative or "on" position: (1) when the door 84 is closed and when the cover assembly 42 is in the open position and (1A) when the drive wheels are in gear and when the grip switch 160 is depressed or engaged (1B) when the drive wheels are in neutral and when the grip switch 160 is not depressed or disengaged, and (1C) when the drive wheels are in the neutral position and the grip switch 160 is depressed; (2) when the door 84 is in the open position and when the cover 42 is in the down or closed position and (2A) when the drive wheels are in gear and the grip switch 160 is engaged or depressed, (2B) when the drive wheels are in neutral and the gear switch 160 is not depressed or disengaged, and (2C) when the drive wheels are in neutral and the gear switch 160 is depressed or engaged; and (3) when the door 84 is closed and the cover 42 is closed or down and (3A) when the drive wheels are in gear and when the grip switch is engaged or depressed, (3B) when drive wheels are in neutral and when the grip switch 160 is not depressed or disenaged; (3C) when the drive wheels are in neutral and the gear switch is depressed or engaged. The engine magneto 144 is in the "off" position only (1) when the gear switch 158 indicates that the drive wheels are in gear and when the grip switch 162 is not depressed or disengaged and/or (2) when the door 84 is in the open position and when the cover 42 is in the open position.

The foregoing circuitry 140 provides important safety features, as it prevents the mower 10 from moving alone without control by the operator and when the cover 42 and door 84 are both open to avoid physical injury to the operator. The various times when the engine is "on" enables the operator to keep the engine "on" under a wide range of conditions and yet not unduly subject the operator to safety hazards.

Although from the foregoing, the manner of use of the collector assembly 12 should be apparent, a brief description of the use thereof will more clearly show the advantages of the assembly. In initial use, the operator raises the cover assembly 42 to the open position shown in FIG. 9, by raising the handlebar assembly 22 and then places a flexible bag 38 on the horizontal portion 58 of the support 46. The top of the bag is folded over the horizontal portion 58 and across the front cross member 64. The flexible support 48 is then raised upwardly and the hanger 76 is hung over the back 62 of the support 58. At this time, the handlebars 22 are pivoted as seen in FIG. 2 to the closed position. Also, the door switch handle 156 is pivoted so that the door 84 is moved to the open position. At this time, the engine 20 is started, and may be started since the gear switch 158 is closed, the drive wheels are in neutral, the cover 42 is down and the door 84 is open.

When the engine is started, the operator depresses the grip switch 160 on the handle; after starting, the drive wheels may be placed in gear. In use, the air-carried grass clippings and other debris pass upwardly through the opening 78 in the top wall of the housing 14. The clippings are carried upwardly in the inlet chute 40 and are directed to the air chamber 100 of the cover 42. Most of the clippings and solid materials fall by gravity into the flexible container 38. Most, if not all, of the other air-carried solids are screened or removed from the air flow as it passes by the separator 116 mounted on the collector 12 and before the air passes to the exhaust 44. Air passes through the exhaust portions 94, 96 and 98 and the air, substantially free of solids, is directed laterally away from the operator, at approximately knee level.

It is seen that the air flow from inlet to exhaust is substantially continuous as it passes through the chute 40 into the air chamber 100 past the separator 116 and outwardly through the exhaust 44. Air turbulence is minimized and this assists in assuring separation of the soils from the air.

When the container 38 becomes full, the indicator 122 slows or stops so that the operator knows to remove the full container, and replace it with a new container. The operator then places the drive wheels in neutral, and releases the grip switch 160. If the operator wishes to keep the engine "on" while changing the bag 38, the door is pivoted to the closed position. If, however, the operator desires to stop the engine, the cover 42 is opened without closing the door 84. In this way, there is assurance that the operator will not have material blown directly into his face.

In removing the full flexible container or bag 38, it is not necessary for the operator to lift the bag off the mower 10, as it is only necessary to lift the hanger 76 of the flexible support slightly off of the horizontal support 58. The container then drops by weight and the operator merely moves the bag laterally away from the machine. The avoidance of lifting is particularly important in the spring, for example, when the grass is moist and heavy. It is thus seen that I have accomplished all the objects previously set forth. A highly effective and simple construction is provided. There is a high degree of safety with this collector and the flexible container, when full, may be readily removed from its position on the mower.

While in the foregoing, there has been provided a detailed description of one particular embodiment of the present invention, it is to be understood that all equivalents obvious to those having skill in the art are to be included within the scope of the invention, as claimed.

What I claim and desire to secure by Letters Patent is:

1. An assembly for collecting grass clippings, in a container, from a lawnmower, said assembly comprising, in combination, a housing for said lawnmower, means for supporting said container in a substantially upright position, with an upper opening and rearwardly of said housing, a member carried on said supporting means for covering said upper opening of said container, said covering member and said container defining a substantially enclosed chamber having an interior, spaced inlet means and outlet means located in said covering member and being positioned entirely above said upper opening, passage means interconnecting said housing with said inlet means, exhaust passage means for communicating said outlet means with said interior, means for separating solid matter from exhaust air prior to passing to the exterior of said chamber from said interior, said housing, said passage means, said covering means, and said exhaust passage means defining a substantially continuous flow path for air passing from said housing to said exterior while said clippings drop by gravity into said flexible container through said upper opening after passing through said inlet means, and means for detachably mounting at least a portion of said supporting means to selectively remove said container from said housing.

2. The assembly of claim 1 wherein said supporting means includes a generally upright portion rigidly mounted on the rear portion of said housing and a substantially horizontal rearwardly extending portion at the upper end of said upright portion, said container being supported on said rearwardly extending portion.

3. The assembly of claim 2 wherein said supporting means includes a flexible member having lower ends secured to said housing, said detachable mounting means being secured to said horizontal portion, and said flexible member supporting at least the rear and bottom portions of said container.

4. The assembly of claim 1 wherein said covering member is rigid and is pivotally mounted on said supporting means, and includes means for providing a substantially air tight seal between said cover means and said upper opening of said container.

5. The assembly of claim 4 including handle means movably mounted on said housing, and cooperating means on said covering member and on said handle means for pivoting said covering member to the open position.

6. The assembly of claim 1 wherein said separating means is mounted in said covering member and said exhaust means exhausts air laterally from said housing and out of the normal path of movement of said mower.

7. The assembly of claim 1 including closure means for said inlet means, said closure means being pivotable between open and closed positions, said covering member being movable between open and closed positions, said lawnmower includes drive means, and means for stopping said drive means when said covering member is in the open position and when said closure means is in the open position.

8. The assembly of claim 1 including visual means for detecting when said container is filled with grass clippings, said detecting means being mounted on said covering member.

9. The assembly of claim 7 wherein said stopping means includes a first switch means for detecting when said covering member is in the open position and a second switch means for detecting when said closure means is in the open position, said drive means includes an engine magneto, a ground connection to said magneto, and said first and second switch means are connected in series between said magneto and said ground connection for grounding out said magneto when said covering member is open and when said closure means is in the open position.

10. The assembly of claim 1 including movable drive wheels for said lawnmower, handle means, first switch means on said handle means for detecting when said handle means is being gripped by an operator, second switch means for detecting when said drive wheels are in drive or in neutral, an engine magneto, a ground connection to said magneto, and said first and second switch means are connected in series between said magneto and said ground connection for grounding out said magneto when said drive wheels are in drive and when said handle means is not being gripped by the operator.

11. The assembly of claim 1 wherein said container is a flexible container.

12. The assembly of claim 11 wherein said container is disposable.

* * * * *